United States Patent [19]

Roeder

[11] 4,143,841
[45] Mar. 13, 1979

[54] AIRCRAFT BREAKAWAY CABIN SECTION

[76] Inventor: George K. Roeder, P.O. Box 4335, Odessa, Tex. 79760

[21] Appl. No.: 814,395

[22] Filed: Jul. 11, 1977

[51] Int. Cl.² .......................................... B64D 25/12
[52] U.S. Cl. .................................................. 244/140
[58] Field of Search .................. 244/140, 2, 120, 131, 244/121; 296/35 B; 180/82 R

[56] References Cited

U.S. PATENT DOCUMENTS 2,446,609  8/1948  Reed ............................... 244/140 X
3,227,399  1/1966  Dastoli et al. .................... 244/140 X

FOREIGN PATENT DOCUMENTS 2326646 12/1974 Fed. Rep. of Germany ......... 296/35 B
1086697 10/1967 United Kingdom .................... 244/140

Primary Examiner—Barry L. Kelmachter
Attorney, Agent, or Firm—Marcus L. Bates

[57] ABSTRACT

An aircraft which includes a lower main support structure to which there is attached wings, empennage, and a cabin section. The cabin section is positioned forwardly of the empennage and is supported in overlying relationship respective to the lower main support structure and to the wings attached thereto. The cabin section has a deck attached to an upper platform of the main support structure in such a manner that the cabin section can be moved horizontally and forwardly respective to the platform. A plurality of fasteners are arranged to affix the cabin section to the main support structure. Some of the fasteners are in the form of releasable bolts and other of the fasteners are in the form of shear bolts which attach the platform and deck together. Accordingly, should the aircraft impact against an object with sufficient force, some of the fasteners are released to enable the cabin section to separate from the remainder of the aircraft and to continue to travel away therefrom.

4 Claims, 7 Drawing Figures

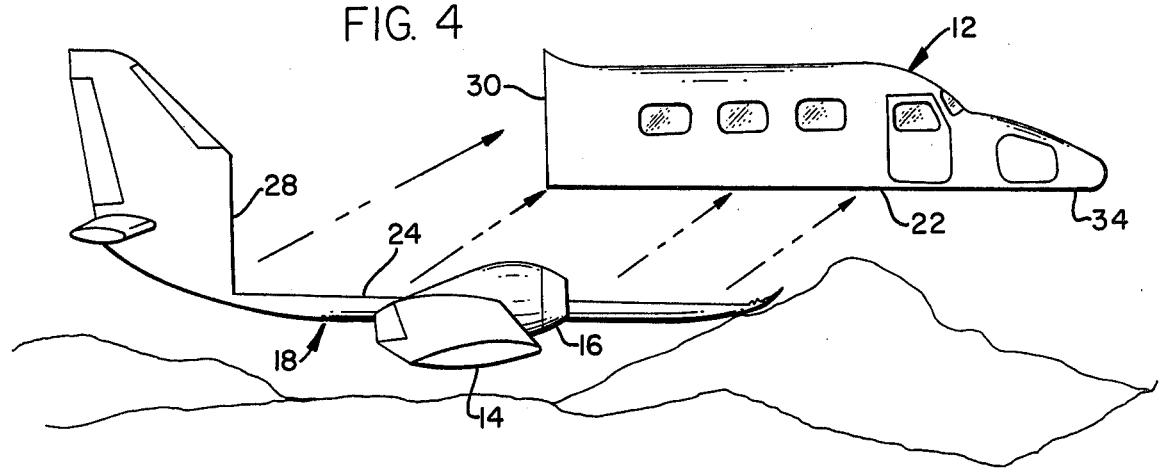
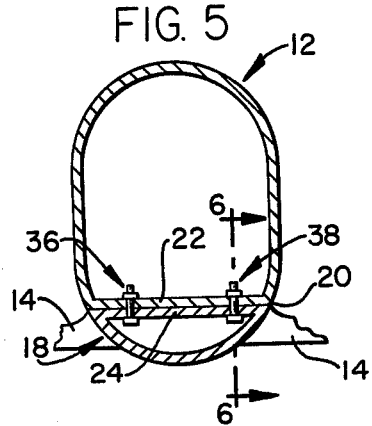
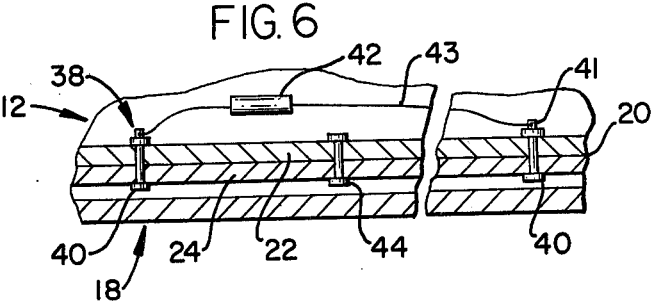
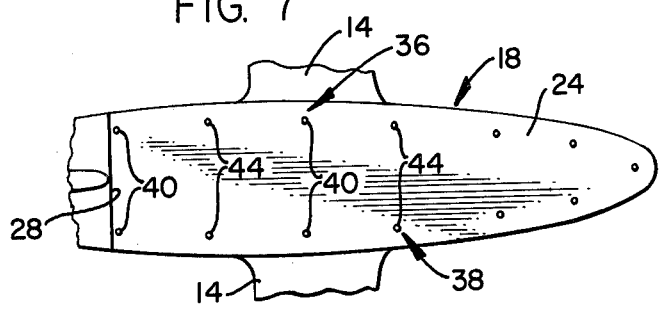

AIRCRAFT BREAKAWAY CABIN SECTION

BACKGROUND OF THE INVENTION

Commercial passenger carrying aircrafts continue to grow in size and to carry a greater number of passengers. Some aircraft can accommodate several hundred passengers along with their baggage.

Most modern successful mount the thrusters to a wet wing, thereby leaving the cabin section available for accommodation of passengers and their baggage. The weight and speed of a modern jet airliner precludes the probability of the aircraft making a successul forced landing anywhere other than a large air terminal and accordingly, when a jet airliner experiences power failure and is forced to land on an unimproved field, the tremendous weight and great speed of the aircraft usually destroys the airplane because it breaks into several pieces, whereupon fuel from the fuel tanks is released, and fire destroys the wreakage.

It would therefore be desirable to be able to separate the passenger carrying cabin section of an airliner from the remainder of the aircraft in the event of a crash landing thereby removing the passengers from proximity of the engines and fuel, and greatly increasing the likelihood of survival.

THE PRIOR ART

U.S. Pat. Nos. Hall 1,548,598, Fulton 2,532,159, Van meter 2,066,810, Stewart 3,377,037, Williams 3,508,727, Bouchnik 3,881,671, Schlanger 3,837,422, German 2,334,194.

The above cited art is considered pertinent to the present subject matter. The concept set forth herein is deemed to be patentable over the cited art for the reason that there is no suggestion found therein wherein the cabin portion of an aircraft is specifically designed to separate from the rest of the aircraft after the craft has hit the ground and is in the act of decelerating.

SUMMARY OF THE INVENTION

An aircraft which includes a passenger carrying cabin section affixed to a lower main support structure, with the wings and empennage supported by the main support structure, and thrusters affixed to the wings for propelling the aircraft through the air. The main support structure includes an upper platform. The cabin section has a deck releasably joined to the upper platform by a plurality of fastener means. Some of the fastener means releasably affix the platform and deck to one another while other of the fastener means are in the form of shear bolts.

Accordingly, should a malfunction occur aboard the airliner, immediately before or during touch down, the pilot releases the releasable fastener means, thereby leaving only the shear bolts which holds the cabin section to the remainder of the air frame. During the crash landing should the aircraft impact against an object, the resultant force causes the cabin section to separate from the remainder of the airplane, thereby removing the passengers to a safer environment.

Accordingly, the primary object of this invention is the provision of an aircraft having a cabin section separable from the remainder of the aircraft structure upon impact or sudden deceleration.

Another object of this invention is the provision of an aircraft having a cabin section releasably affixed to the remainder of the aircraft in such a manner that the cabin section parts from the remainder of the aircraft and travels forwardly thereof during a crash landing.

A further object of the present invention is the provision of an aircraft which includes a separable cabin section arranged such that sudden arrest of the aircraft causes the cabin section to separate from the remainder of the aircraft and continue to travel in a horizontal direction along the surface of the ground.

Another object of this invention is to provide a method by which an aircraft can be separated during an emergency landing such that a cabin containing passengers therein is separated from the rest of the aircraft after the craft has touched down and is skidding along the ground.

Still another object of the present invention is the provision of both method and apparatus by which an aircraft has a cabin section affixed to a main support structure thereof in such a manner that when a crash landing seems inevitable, releasable fasteners are actuated thereby rendering the cabin section separable from the remainder of the aircraft.

The above objects are attained in accordance with the present invention by the provision of a combination of elements which are fabricated in a manner substantially as described in the above abstract and summary.

These and various other objects and advantages of the invention will become readily apparent to those skilled in the art upon reading the following detailed description and claims and by referring to the accompanying drawings.

BRIEF DESCRIPTION OF THE DRAWINGS

FIG. 4 is a disassembled view of the aircraft disclosed in FIGS. 1 and 2;

FIG. 5 is a cross-sectional view taken along lines 5—5 of FIG. 1;

FIG. 6 is a fragmented, enlarged, part cross-sectional illustration taken along lines 6—6 of FIG. 5; and, FIG. 7 is a fragmented, part diagrammatical, part symmetrical illustration of an airplane made in accordance with the present invention.

DETAILED DESCRIPTION OF THE PREFERRED EMBODIMENT

Figure 1:
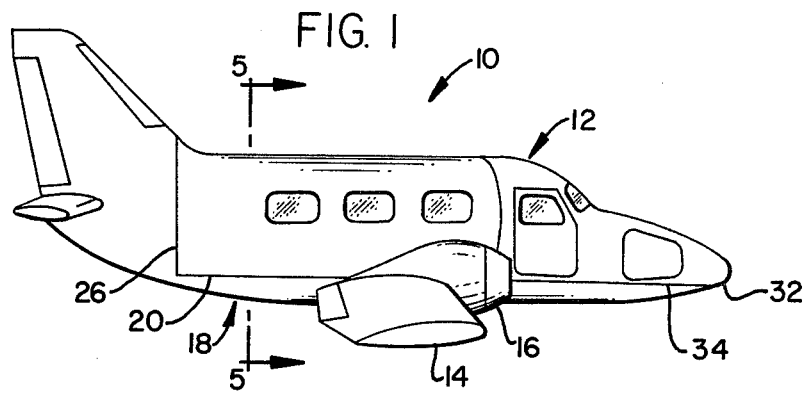
FIG. 1 is a side elevational view of an aircraft made in accordance with the present invention.

FIG. 1 discloses an aircraft 10 made in accordance with the present invention. The aircraft includes a cabin section 12 positioned in superimposed relationship respective to a wing 14. The wing is comprised of the usual right and left cantilever wing panels. Thrusters 16, in the form of jet engines, are supported from the wing in spaced relationship to the cabin section. The wing encloses the fuel tanks for fueling the thrusters, thereby isolating the fuel from the cabin section.

Figure 2:
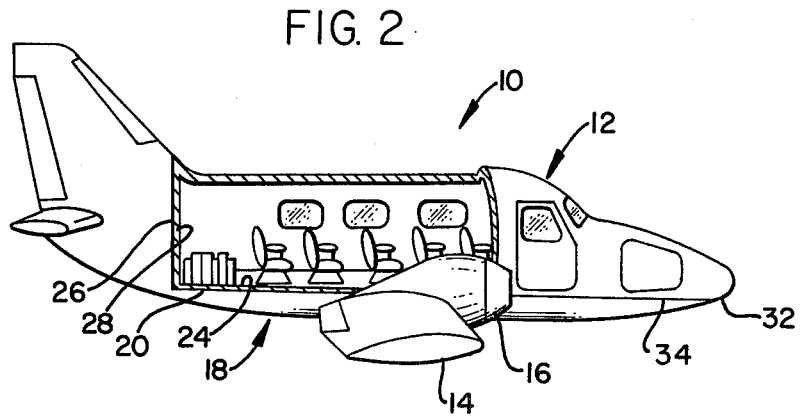
FIG. 2 is a part cross-sectional view of the aircraft disclosed in FIG. 1.
Figure 3:
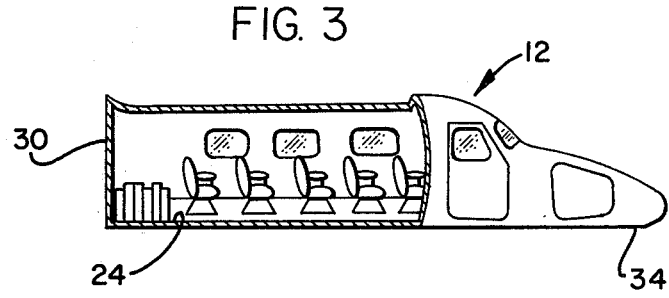
FIG. 3 illustrates a separable cabin section which forms part of the aircraft disclosed in FIGS. 1 and 2.

A main support structure 18 is releasably joined to the cabin section along interface 20, as will be more fully disclosed later on in this disclosure. As seen in FIG. 4, the cabin section includes a deck 22 while the main support structure includes a platform 24, with the platform and deck being joined together along the beforementioned interface. Interface 26 of FIG. 1 is formed by the forward end 28 of the empennage being joined to the rear end 30 of the cabin section as seen illustrated in FIGS. 2 and 4. The nose 32 of the aircraft is jointly formed by the forwardmost end of the cabin section and main support structure, with the interface 20 continuing as indicated by numeral 34 at the forward end of the aircraft, as best illustrated in FIGS. 1 and 4.

As seen illustrated in FIGS. 5 and 7, a plurality of fastener means 36 and 38 affix the deck and platform to one another in such a manner that the cabin section is normally held rigidly affixed to the main support structure under all conceivable conditions encountered during the operation of the aircraft. A substantial number of the fastener means 36 and 38 are comprised of a releasably fastener means 40 such as for example, an explosive bolt to which there is attached means 42 by which the bolt can be detonated.

The explosive bolts preferably are of the type used in the aerospace industry and which may be exploded, thereby eliminating the fastener means so far as concerns the attachment of the deck to the platform. Means 42 preferably is a battery and switch arrangement, with the switches being located within the pilot's compartment so that the captain of the aircraft can actuate the means 42 whenever it is desired to explosively remove the bolts 40 which join the platform and deck together.

Shear bolts 44 are included along with the explosive bolts 40 in the illustrated pattern set forth in FIG. 7, for example only. The shear bolts are parted or sheared whenever deck 22 moves respective to platform 24 with sufficient force to cause the bolt material to shear. The shear bolts 44 can be made of soft aluminum while the deck and platform are made of harder material, for example. Further, the shear bolts 44 can be undercut in proximity of the interface 20 thereby reducing the forces necessary to fail the bolt.

The ratio of releasable fastener means 40 respective to the shear bolts 44 can be selected to enable separation of the cabin section to occur under predetermined magnitudes of impact, but preferably is on the order of 4 to 1, with the total number of fastener means requiring an impact equal to 4 times the pull of gravity. Thusly, when the exclusive bolts are detonated, an impact force equal to one G will cause the cabin section to separate from the remainder of the aircraft.

Alternatively, all of the attachments holding the cabin section to the main support may be of the releasable type. Moreover, a releasable fastener means which is mechanically rather than explosively actuated can be employed in joining the cabin to the support structure.

In operation, the aircraft of FIG. 1 is in flight and experiences difficulty indicating that a crash landing is unavoidable. The crew members of the aircraft implement the usual emergency crash procedure, and as the aircraft 10 is about to touch down for an emergency landing the means 42 is actuated, thereby detonating a number of fastener means 40.

As the aircraft contacts and slides along the ground, the main support structure impacts against an obstacle thereby decelerating the main support structure sufficiently to shear the shear bolts 44, whereupon the cabin section 20 continues to travel horizontally away from the main support structure.

Upon impact, the fuel tanks usually rupture and the engines strike the rough terrain and commence to disintegrate. The fuel usually ignites, setting fire to the entire area about the wreckage. Accordingly, the cabin section of the present invention continues to travel to a safe distance away from the remainder of the aircraft, with the occupants being safely housed therewithin.

It is preferred that the cabin section contains passengers and their personal effects while the main support structure contains baggage and cargo. Since the wings, empennage, baggage, main support structure, thrusters, and fuel are separated from the passenger containing cabin section, the dangers associated with crash landings are largely overcome by the present invention.

I claim:

1. An aircraft having a cabin section affixed to a main support structure; a wing and an empennage supported by said main support structure, and thrusters including means by which said thrusters are affixed to the aircraft for propelling said aircraft through the air;

said cabin section having a forward end, a rear end, a deck, a roof, and sidewalls joining said roof and deck together;

said main support structure terminates upwardly in a platform, means by which said platform is releasably joined to said deck so that the main support structure and the cabin section are mated to present a fuselage suitable for propagation through the air, and wherein said cabin section can be separated from the remainder of the aircraft by moving the cabin section forwardly in a substantially horizontal direction respective to the main support structure;

said means by which said platform is releasably joined to said deck includes a first and second group of fastener means, said first group of fastener means comprising a plurality of shear bolts, said second group of fastener means comprising a plurality of remotely actuated fasteners which are placed to releasably join said deck and platform together; said second group of fastener means being exlosive bolts having detonators, remote means for activating said detonators so that said second group of fastener means may be unfastened, thereby leaving the cabin section attached to the main support structure by said shear bolts which will shear only when the support structure is suddenly arrested by impact, the first group of fastener means being sheared upon impact of the support structure to enable the cabin section to continue to move in a forward direction respective to the main support structure, thereby separating the cabin section from the remainder of the aircraft.

2. The aircraft of claim 1 wherein said deck and platform lie in substantially a horizontally disposed plane when the aircraft is in level flight, and said rear end of said cabin section terminates forwardly of said empennage so that the cabin section can move horizontally away from the remainder of the aircraft when said deck of said cabin section is separated from said platform of said main support structure.

3. The aircraft of claim 1 wherein said detonators are electrically energized to remove the bolts from fastened relationship respective to the deck and platform; said remote activating means comprising circuit means, including a switch and a source of current, by which said explosive bolts are detonated;

said deck and platform lie substantially horizontally, said rear end of said cabin section terminates forwardly of said empennage so that the cabin section can move horizontally away from the remainder of the aircraft when the deck is separated from the platform.

4. The method of assembling an aircraft wherein the aircraft includes a passenger cabin, a main support structure, a wing, and an empennage connected to said main support structure, and thrusters mounted to propel the aircraft in flight, comprising the steps of:
(1) building said passenger cabin separate from the rest of said aircraft;
(2) building said main support structure such that said cabin can move horizontally in a forward direction respective thereto;
(3) releasably affixing said cabin to said support structure by connecting the cabin to the support structure with a first and second group of fastener means;
(4) using a plurality of shear bolts for said first group of fastener means to provide low shear forces for separation of the cabin from the support structure;
(5) using a plurality of releasable fasteners for said second group of fastener means to provide a high shear force by which the cabin is attached to the support structure;
(6) using explosive bolts for said second group of fastener means and electrically detonating the bolts from a location remote from said second group of fastener means so that the cabin is attached to the suppport structure with low shear forces;
whereupon the cabin will then separate from the remainder of the aircraft upon sudden deceleration of a magnitude to shear the first group of fastener means, so that the cabin travels horizontally away from the rest of the aircraft.

* * * * *

UNITED STATES PATENT OFFICE
CERTIFICATE OF CORRECTION

Patent No. 4,143,841    Dated March 13, 1979

Inventor(s) GEORGE K. ROEDER

It is certified that error appears in the above-identified patent and that said Letters Patent are hereby corrected as shown below:

Column 1, line 8, substitute --airliners-- for "successful";
          Line 12, correct the spelling of "successful";
Column 4, line 42, substitute --are-- for "being".

Signed and Sealed this

Eighteenth Day of September 1979

[SEAL]

Attest:

LUTRELLE F. PARKER

Attesting Officer    Acting Commissioner of Patents and Trademarks